United States Patent
Chang et al.

(10) Patent No.: US 8,721,824 B2
(45) Date of Patent: May 13, 2014

(54) PRODUCTION METHOD, WORKPIECE AND PRODUCTION DEVICE OF THREE-DIMENSIONAL PATTERN

(75) Inventors: Chien-Min Chang, Taipei (TW); Wan-Li Chuang, Taipei (TW); Jung-Chin Wu, Taipei (TW)

(73) Assignee: Compal Electronics, Inc., Taipei (TW)

( * ) Notice: Subject to any disclaimer, the term of this patent is extended or adjusted under 35 U.S.C. 154(b) by 52 days.

(21) Appl. No.: 12/881,186

(22) Filed: Sep. 14, 2010

(65) Prior Publication Data

US 2011/0064924 A1   Mar. 17, 2011

Related U.S. Application Data

(60) Provisional application No. 61/241,963, filed on Sep. 14, 2009.

(51) Int. Cl.
*B32B 38/06* (2006.01)
(52) U.S. Cl.
USPC ............ 156/219; 156/273.5; 156/275.5; 156/285; 264/293
(58) Field of Classification Search
USPC ............ 156/213, 285, 209, 219, 247, 275.5, 156/493, 496; 249/127; 428/457; 264/293
See application file for complete search history.

(56) References Cited

U.S. PATENT DOCUMENTS

| | | | | |
|---|---|---|---|---|
| 3,551,232 A | * | 12/1970 | Thompson | 156/87 |
| 5,817,402 A | * | 10/1998 | Miyake et al. | 428/159 |
| 2004/0166336 A1 | * | 8/2004 | Lindvold et al. | 428/457 |
| 2005/0150589 A1 | * | 7/2005 | Amos et al. | 156/209 |
| 2009/0208756 A1 | * | 8/2009 | Kimura et al. | 428/412 |

FOREIGN PATENT DOCUMENTS

CN    1220210 A    6/1999

OTHER PUBLICATIONS

"First Office Action of China Counterpart Application", issued on Jul. 20, 2011, p. 1-p. 6, in which the listed reference was cited.

* cited by examiner

*Primary Examiner* — Katarzyna Wyrozebski Lee
*Assistant Examiner* — Carson Gross
(74) *Attorney, Agent, or Firm* — Jianq Chyun IP Office

(57) ABSTRACT

A production method of three-dimensional pattern is disclosed. First, an adhesive layer is applied on a three-dimensional workpiece. Next, a film is vacuum adsorbed on the adhesive layer so that the film is impressed onto the adhesive layer to form the three-dimensional pattern on the adhesive layer. Finally, the adhesive layer is cured by implementing a plurality of heat treatments thereon. A workpiece of three-dimensional pattern and a production device of three-dimensional pattern are also disclosed.

11 Claims, 4 Drawing Sheets

PRODUCTION METHOD, WORKPIECE AND PRODUCTION DEVICE OF THREE-DIMENSIONAL PATTERN

CROSS-REFERENCE TO RELATED APPLICATION

This application claims the priority benefit of U.S.A. provisional application Ser. No. 61/241,963, filed on Sep. 14, 2009. The entirety of the above-mentioned patent application is hereby incorporated by reference herein and made a part of specification.

BACKGROUND OF THE INVENTION

1. Field of the Invention

The present invention generally relates to a production method and a production device of three-dimensional pattern, and more particularly, to a method and a production device of forming a three-dimensional pattern on a three-dimensional workpiece.

2. Description of Related Art

Currently, electronic devices such as notebook computers, mobile phones, or digital cameras mostly adopt metal material for constituting the exterior. In order to advance the overall aesthetic appearance of electronic devices, various patterns are usually formed on the appealing configuration.

Patterns are produced on the surface of metal material frequently by etching metal material with a solvent or by paint-spraying and transfer printing. Nonetheless, the surface treatment technique of the former is complicated and difficult, and the production thereof is highly contaminative. The latter is restrained by the chemical property of metal material, such that artistic configuration cannot be produced. Taking the injection molding case made of magnesium alloy as an example, due to the high chemical activity of the alloy and the needs to perform lapping or repairing during the surface process, it is unable to make an original-color appearance with metallic sense on the workpiece surface.

If patterns are formed on a plastic casing, IMD (In Mold Decoration), such as IMR (In Mold Roller) or IMF (In Mold Film), is commonly used which bonds a decoration stack having patterns therein to the plastic casing by injection molding. However, the method requires high adhesion for each layer of the decoration stack so that shedding problem often arise in practice.

SUMMARY OF THE INVENTION

Accordingly, the present invention is directed to a production method of three-dimensional pattern so as to form a three-dimensional pattern on a three-dimensional workpiece.

The present invention is directed to a workpiece of three-dimensional pattern.

The present invention is directed to a production device of three-dimensional pattern so as to form a three-dimensional pattern on a three-dimensional workpiece.

An embodiment of the present invention provides a production method of three-dimensional pattern. First, an adhesive layer is applied on a three-dimensional workpiece. Next, a film is formed on the adhesive layer by using vacuum adsorption, so that the film is impressed on the adhesive layer and a three-dimensional pattern is formed on the adhesive layer. Finally, the adhesive layer is cured by implementing a plurality of heat treatments thereon.

An embodiment of the present invention provides a workpiece of three-dimensional pattern which includes a three-dimensional workpiece and an adhesive layer attached to the three-dimensional workpiece by vacuum absorption and impressed by a film to form a three-dimensional pattern wherein the adhesive layer is irradiated by light or heated to fix the shape of the three-dimensional pattern.

An embodiment of the present invention provides a production device of three-dimensional pattern adapted to form a three-dimensional pattern on a surface of a workpiece. The production device includes a lower mold, a vacuum generator, a upper mold, a film and a curing unit. The lower mold, on which the workpiece is adapted to be mounted, has at least through hole. The vacuum generator communicates with the through hole. The upper mold is disposed over the lower mold and adapted to expose a surface of the workpiece. The film is disposed on the upper mold and over the workpiece exposed by the upper mold, wherein the film has a three-dimensional pattern suitable for impressing an adhesive layer on the workpiece. The curing unit is capable of applying light or heat on the adhesive to cure the adhesive layer.

Based on the depiction above, in the embodiment of the present invention, the above-mentioned film is formed on the adhesive layer by using vacuum adsorption so that the film can be impressed onto the adhesive layer to form the three-dimensional pattern on the adhesive layer. In this way, the impressing process of the three-dimensional pattern is not limited by the shape of the workpiece; i.e. a workpiece with any shape can have a three-dimensional pattern by using the production method of the embodiment. Moreover, the present invention saves burdensome process operations to form a three-dimensional pattern on the surface of a three-dimensional workpiece made of metal material.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
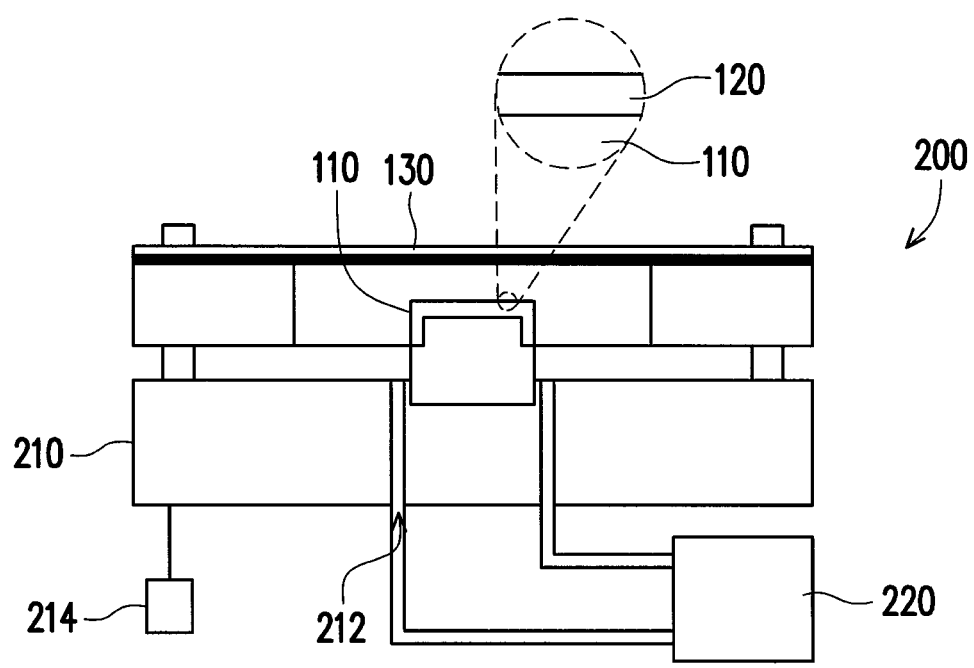
FIGS. 1-5 are flow diagrams of a production method of three-dimensional pattern according to an embodiment of the present invention.
Figure 2:
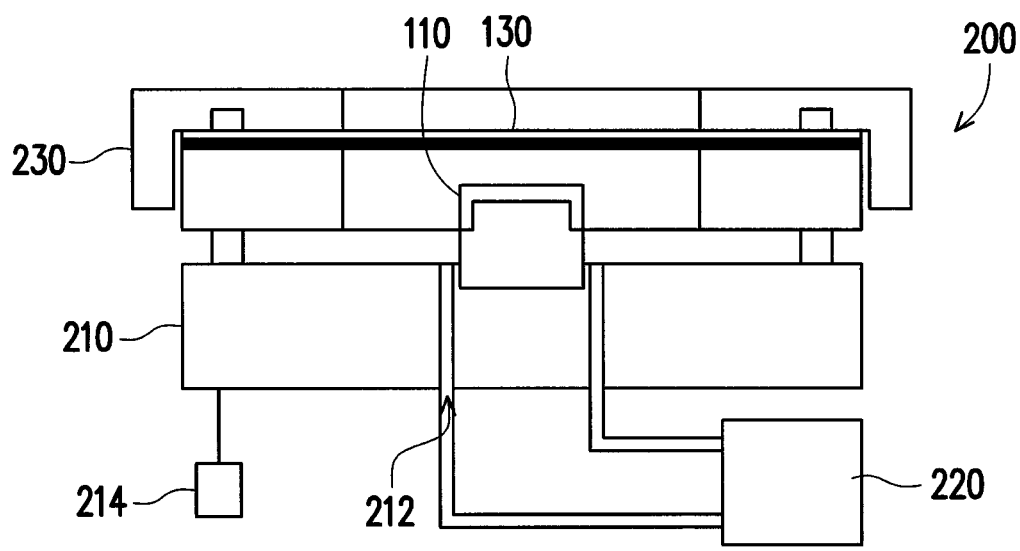
Figure 3:
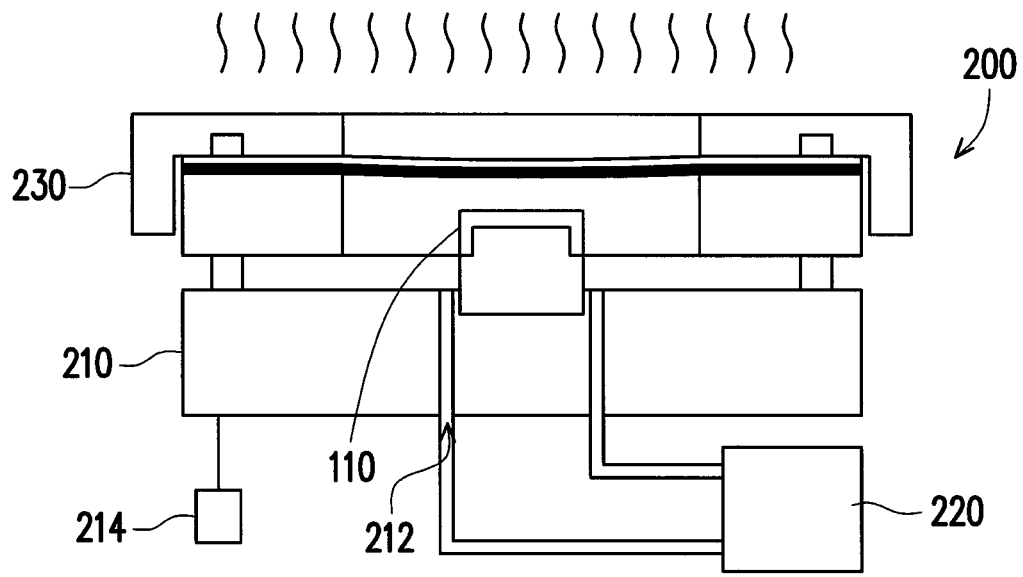

FIGS. 1-5 are flow diagrams of a production method of three-dimensional pattern according to an embodiment of the present invention. Referring to FIGS. 1-3, first, a first adhesive layer 120 is applied on a three-dimensional workpiece 110 and the three-dimensional workpiece 110 is disposed on a vacuum heat transfer equipment (VHT equipment) 200. In the embodiment, the three-dimensional workpiece 110 is an injection molding case made of magnesium alloy, which the present invention is not limited to; in other unshown embodiments, the three-dimensional workpiece 110 can be an injection molding parts made of plastic, carbon fiber or other appropriate metal materials. Next, a film 130 is fixed on the VHT equipment 200 and disposed on the three-dimensional workpiece 110.

Figure 4:
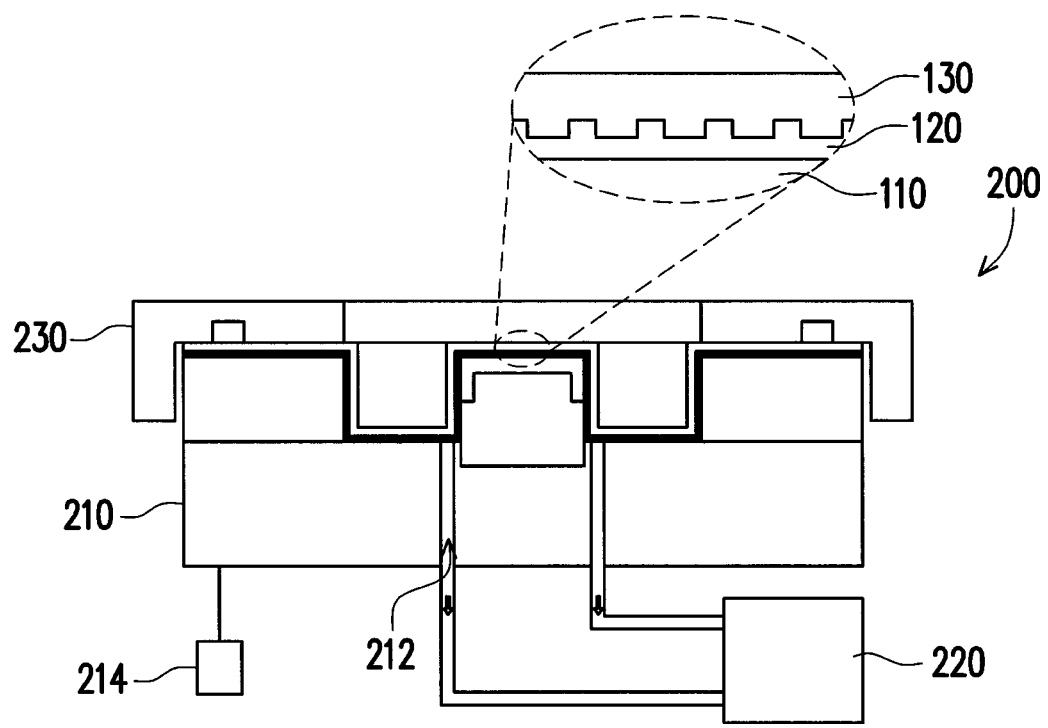
Figure 5:
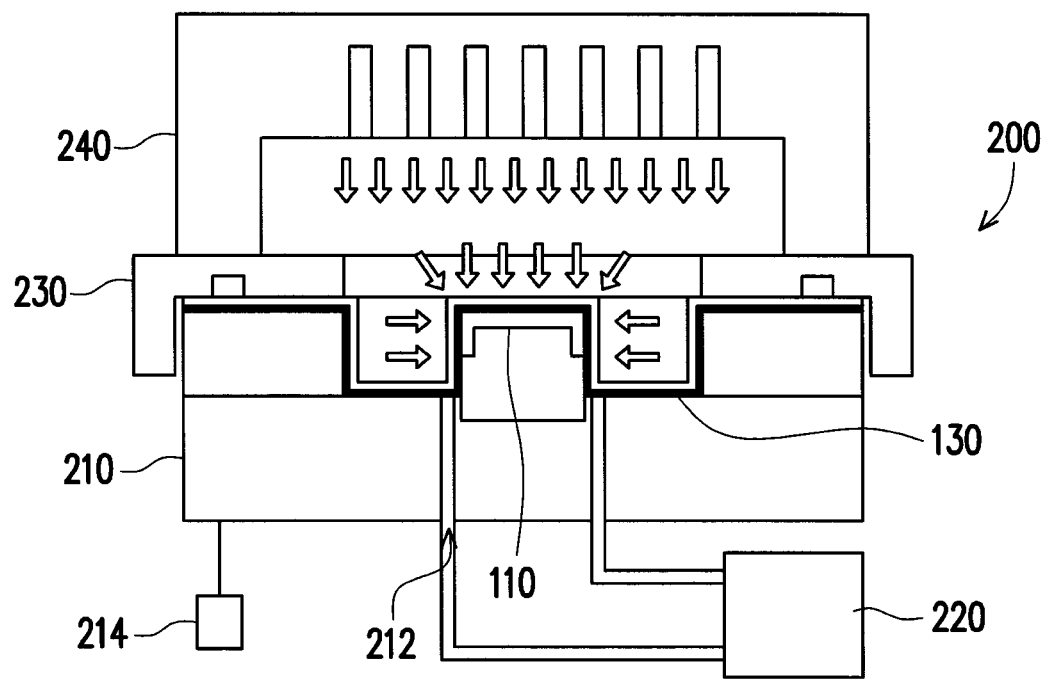

Referring to FIGS. 4 and 5, the VHT equipment 200 would conduct a vacuum processing on the space where the three-dimensional workpiece 110 is located in, so that the film 130 is adsorbed on the three-dimensional workpiece 110. The VHT equipment 200 includes a lower mold 210, a vacuum generator 220, a upper mold 230 and a curing unit 240. The three-dimensional workpiece 110 may be mounted on the lower mold 210, and the lower mold 210 has at least a through hole 212. The vacuum generator 220 communicates with the through hole 212. The upper mold 230 is disposed over the lower mold 210 and exposes a surface of the three-dimensional workpiece 110. The curing unit 240 can cures the first adhesive layer 120 by light irradiating or heating.

Specifically, the film 130 herein has a three-dimensional pattern, so that when the film 130 is adsorbed on the three-dimensional workpiece 110, the three-dimensional pattern of the film 130 would be transferred onto the first adhesive layer 120 on the three-dimensional workpiece 110 by impressing. Next, the VHT equipment 200 conducts a curing process to cure the first adhesive layer 120 on the three-dimensional workpiece 110. Finally, the film 130 on the three-dimensional workpiece 110 is removed so as to form the three-dimensional pattern on the three-dimensional workpiece 110.

Continuing to FIG. 3, in the embodiment, prior to vacuum adsorbing the film 130 onto the three-dimensional workpiece 110, the VHT equipment 200 would heat the film 130 by means of infrared radiation so that the film 130 gets softened, which facilitates the successive process where the film 130 can be tightly adhered onto the surface of the three-dimensional workpiece 110 during the vacuum adsorption.

Furthermore, referring to FIGS. 1-5, the lower mold 210 has a lifting mechanism 214. Before the film 130 is vacuum absorbed on the three-dimensional workpiece 110, the lower mold 210 is uplifted slowly from a lower location to effectively prevent generation of air bubbles until the film 130 is vacuum absorbed on the three-dimensional workpiece 110. In addition, the first adhesive layer 120 can also thereby reduce the fluidity thereof to reach a semi-dry status, which facilitates the successive process where the film 130 is impressed onto the first adhesive layer 120. On the other hand, after the film 130 is impressed onto the first adhesive layer 120, the first adhesive layer 120 can be cured by photo-curing or thermal-curing, such as UV (ultraviolet) irradiating or baking, depending on the type of the first adhesive layer 120 to be used.

For an example, in the baking process, a batch of workpieces is baked in a large oven, and the operating parameters may be adjusted based on actual conditions. Generally, the baking temperature ranges 150 to 200 degrees Celsius.

It should be noted that the photo-curing process includes two parts as follows. Firstly, when the film 130 is impressed on the first adhesive layer 120, the first adhesive layer 120 is irradiated with UV of lower energy intensity (200 to 300 mj/cm$^2$) to keep the shape of the three-dimensional patterns of the first adhesive layer 120. Secondly, when the film 130 is moved away from the first adhesive layer 120, the first adhesive layer 120 is irradiated with UV of higher energy intensity (1000 to 1200 mj/cm$^2$) to fix the shape of the three-dimensional patterns of the first adhesive layer 120.

Here, either photo-curing or thermal-curing is a heat treatment so that photo-curing and thermal-curing may be used together. In an example, photo-curing is used to keep the shape of the shape of the three-dimensional patterns, and thermal-curing is then used to fix the shape thereof. In another example, thermal-curing is used to keep the shape of the shape of the three-dimensional patterns, and photo-curing is then used to fix the shape thereof. The above examples all achieve the desired effect of this invention.

Figure 6:
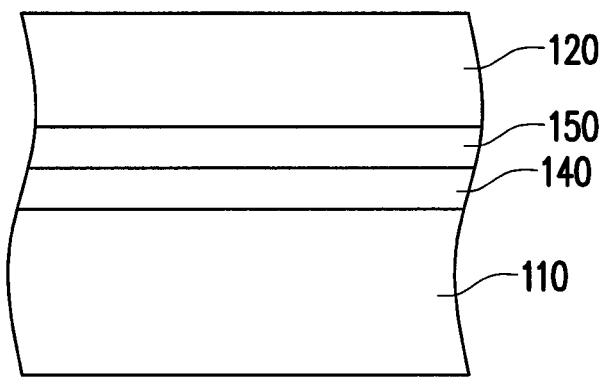
FIG. 6 is a diagram of a production method of three-dimensional pattern according to another embodiment of the present invention.

FIG. 6 is a diagram of a production method of three-dimensional pattern according to another embodiment of the present invention. In the embodiment, it is different from the above-mentioned embodiment that prior to applying the first adhesive layer 120 on the three-dimensional workpiece 110, a primer layer 140 is applied on the surface of the three-dimensional workpiece 110 so as to connect the three-dimensional workpiece 110 and the first adhesive layer 120 to each other, followed by applying a color layer 150 on the primer layer 140 so as to color the three-dimensional workpiece 110. However, the embodiment does not limit the primer layer 140 and the color layer 150. In another unshown embodiment, prior to applying the first adhesive layer 120, a color primer layer is applied on the three-dimensional workpiece 110, where the primer layer is doped by color dye therein so as to save the operation to apply the color layer 150 on the primer layer 140 as shown in FIG. 6.

Figure 7:
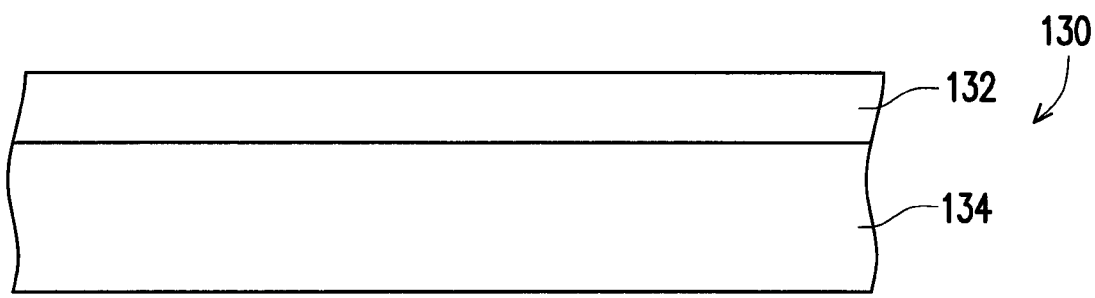
FIGS. 7-9 are diagrams for fabricating the film in FIG. 1.
Figure 8:
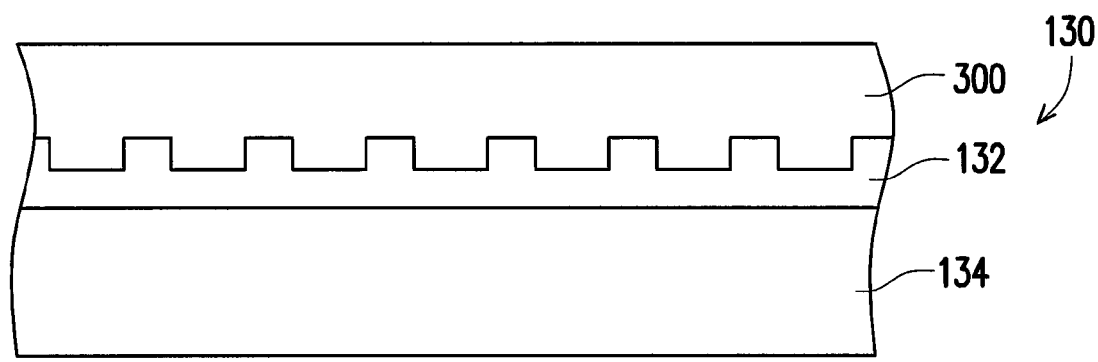
Figure 9:
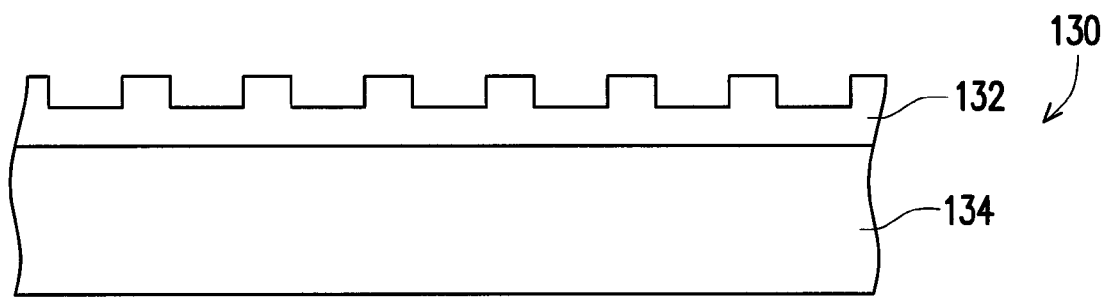

FIGS. 7-9 are diagrams for fabricating the film in FIG. 1. Referring to FIGS. 7-9, first, a second adhesive layer 132 is applied on a substrate 134. In the embodiment, the material of the substrate 134 is, for example, polycarbonate (PC), polyethylene terephthalate (PET) or polyvinyl choloride (PVC). Next, a mold 300 is impressed onto the second adhesive layer 132 so as to transfer-print the three-dimensional pattern of the mold 300 to the second adhesive layer 132, followed by curing the second adhesive layer 132. Finally, the mold 300 is removed so that a three-dimensional pattern complementary to the three-dimensional pattern of the mold 300 is formed on the second adhesive layer 132.

In summary, in the embodiment of the present invention, the film is impressed on the adhesive layer on the three-dimensional workpiece so as to form the three-dimensional pattern on the three-dimensional workpiece. The method can effectively simplify the fabrication procedure of forming the three-dimensional pattern on the three-dimensional workpiece and avoid burdensome surface process operations on the three-dimensional workpiece. In addition, the film can be adsorbed on a three-dimensional workpiece with different shapes through a VHT equipment by using the production method of the embodiments, which is advantageous in reducing the technical difficulty of forming the pattern on a three-dimensional workpiece and also reducing the production cost.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A production method of three-dimensional pattern, comprising:

applying a first layer on a three-dimensional workpiece, wherein the three-dimensional workpiece bends at a place thereof;

pressing a film onto the first layer by vacuum so that the film is impressed onto the first layer and a first three-dimensional pattern is formed on the first layer;

curing the first layer by implementing a plurality of treatments thereon; and removing the film from the first layer, wherein the step of curing the first layer comprising:

irradiating the first layer with a first UV to keep the shape of the first three-dimensional pattern when the first layer is impressed by the film; and irradiating the first layer with a second UV to fix the shape of the first three-dimensional pattern after the film is removed from the first layer, wherein the irradiating energy intensity of the second UV is higher than the irradiating energy intensity of the first UV.

2. The production method of three-dimensional pattern as claimed in claim 1, further comprising:
applying a primer layer on the three-dimensional workpiece before applying the first layer.

3. The production method of three-dimensional pattern as claimed in claim 2, further comprising:
disposing a color layer on the primer layer.

4. The production method of three-dimensional pattern as claimed in claim 2, wherein the primer layer is a color primer layer.

5. The production method of three-dimensional pattern as claimed in claim 1, further comprising:
softening the film before pressing the film onto the first layer by vacuum.

6. The production method of three-dimensional pattern as claimed in claim 1, wherein the fabrication method of the film comprises:
applying a second layer on a substrate;
using a mold to be impressed onto the second layer to faun a second three-dimensional pattern on the second layer;
curing the second layer; and
removing the mold.

7. The production method of three-dimensional pattern as claimed in claim 6, wherein the first three-dimensional pattern and the second three-dimensional pattern are complementary to each other.

8. The production method of three-dimensional pattern as claimed in claim 1, wherein the material of the three-dimensional workpiece is metal.

9. The production method of three-dimensional pattern as claimed in claim 1, wherein the material of the three-dimensional workpiece is plastic or carbon fiber.

10. The production method of three-dimensional pattern as claimed in claim 1, wherein the energy intensity of the first UV ranges 200 to 300 mj/cm2, and the energy intensity of the second UV ranges 1000 to 1200 mj/cm2.

11. The production method of three-dimensional pattern as claimed in claim 1, wherein at least one of the treatments is a heat treatment.

* * * * *